April 10, 1934.    F. T. FARMER    1,954,380
LAWN MOWER
Filed May 13, 1931    4 Sheets-Sheet 2

Inventor
Frank T. Farmer
By Dodge and Sons,
Attorneys.

April 10, 1934.  F. T. FARMER  1,954,380
LAWN MOWER
Filed May 13, 1931  4 Sheets-Sheet 3
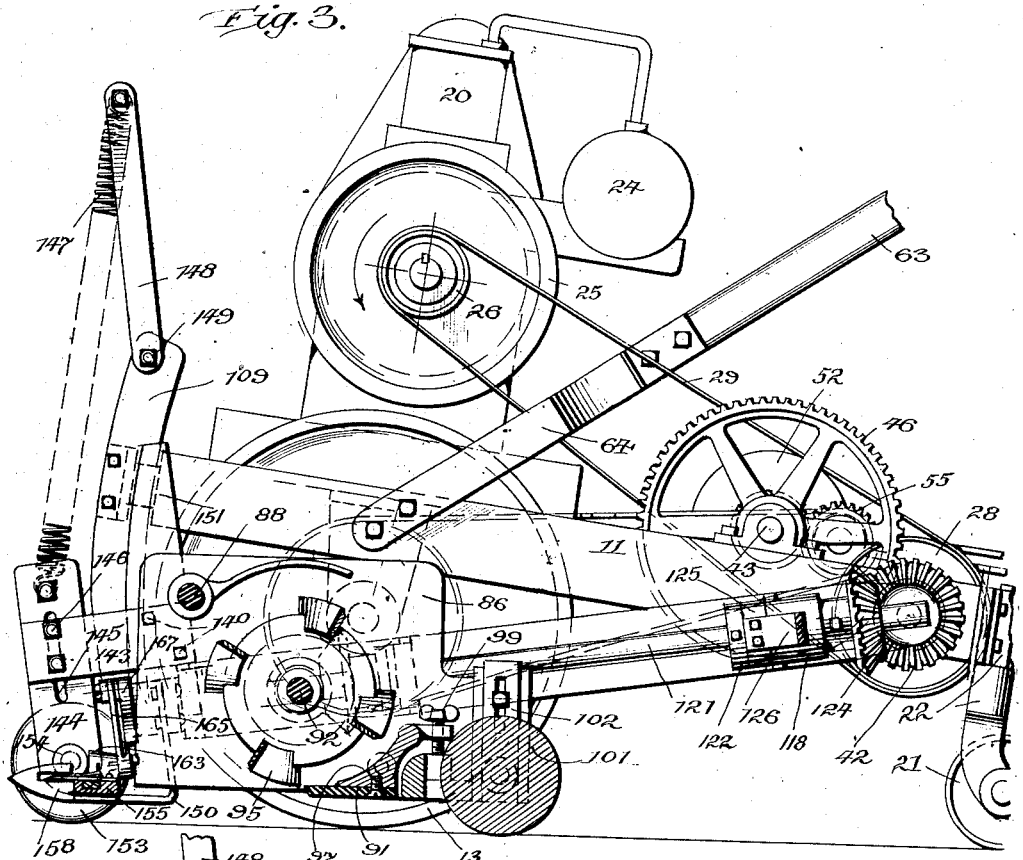
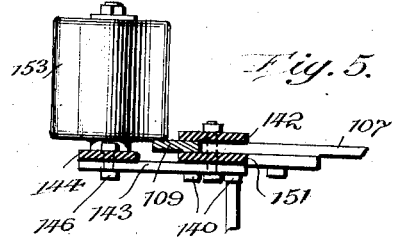
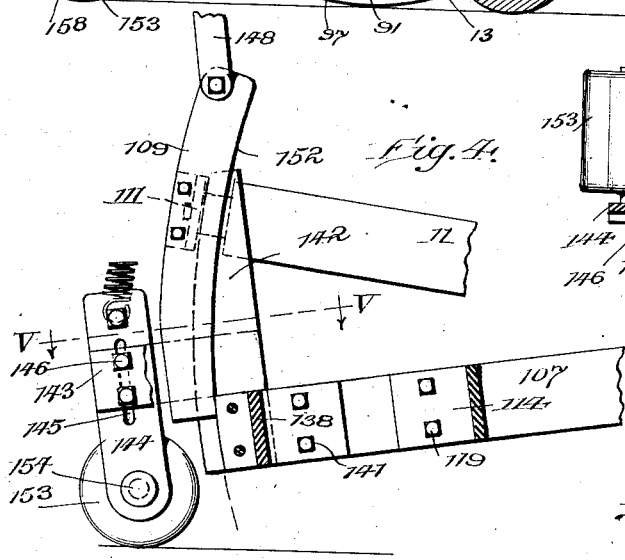
Inventor
Frank T. Farmer
By Dodge and Sons
Attorneys.

April 10, 1934.  F. T. FARMER  1,954,380
LAWN MOWER
Filed May 13, 1931  4 Sheets-Sheet 4
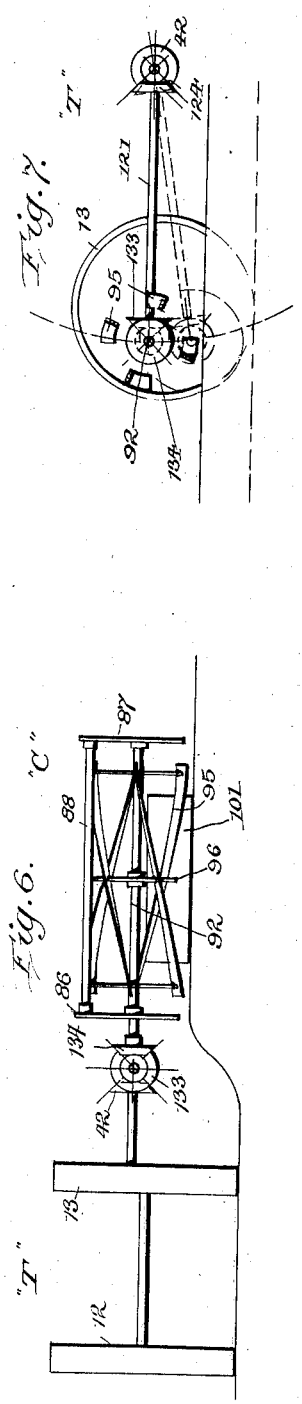
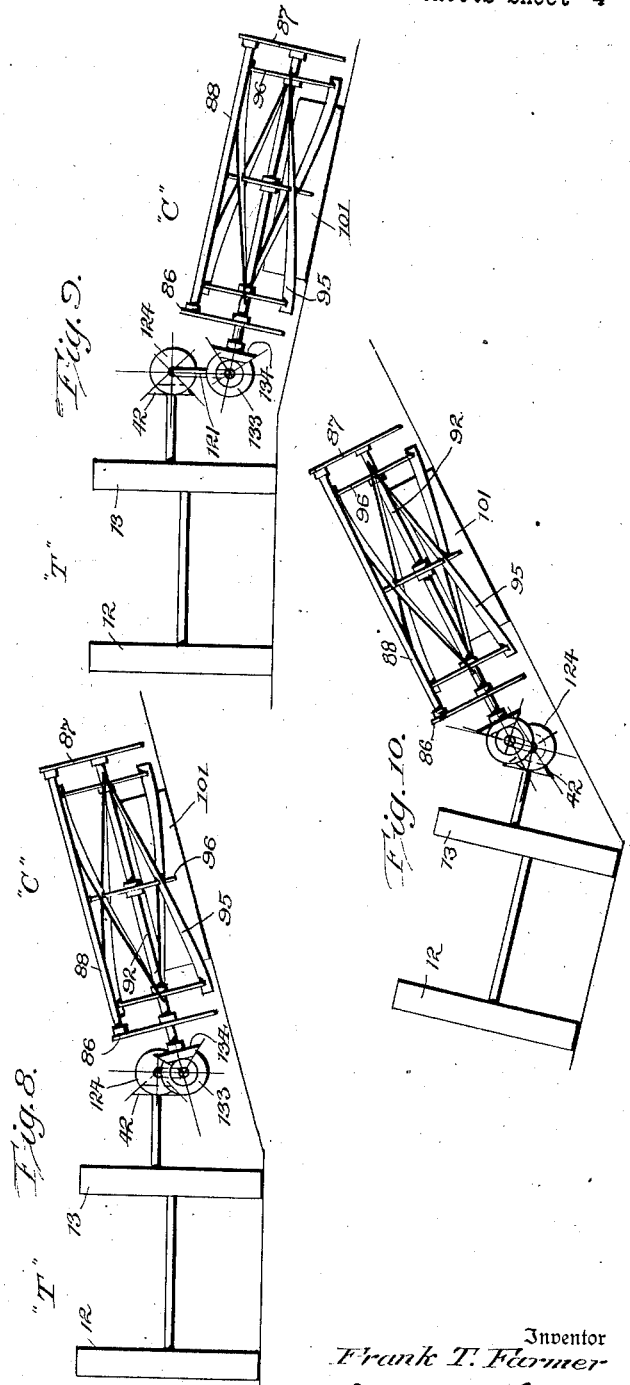
Inventor
Frank T. Farmer
By Dodge and Sons
Attorneys.

Patented Apr. 10, 1934

1,954,380

UNITED STATES PATENT OFFICE 1,954,380

LAWN MOWER

Frank T. Farmer, Richmond, Ind., assignor of one-half to Robert E. Farmer, Richmond, Ind.

Application May 13, 1931, Serial No. 537,088

15 Claims. (Cl. 56—25)

This invention pertains to lawn mowers and more particularly to mowers of the motor actuated and motor propelled type.

The invention has for its main object the production of a mower wherein a power and propelling unit is interconnected with a mower unit in such manner that the two may accommodate themselves with reference to each other and to various physical conditions or varying contours of the ground surface over which the mower is to be passed. Stated in another way, the mower unit, as such, is so connected to the propelling and driving unit that the former may be said to have a universal movement with reference to the latter whereby, while still maintaining the actuating connection at all times, the mower may accommodate itself to various conditions of the surface of the ground, as for instance mounds and hollows or in fact virtually any change in contour which may occur as the mower passes over the surface to be mowed,—this without "scalping" or "digging in" as the case may be.

A still further object of the invention is to provide means whereby a cutter-bar may be readily positioned in front of the mower proper with a view of employing the same to cut down high standing tough grass or weeds and thus prepare the surface so that the mower proper may shear the grass and such portion of the weeds as may be left upstanding,—and this without difficulty.

A further object of the invention is to so construct the machine that the mower element proper may be run close to curbings, walls, fences, monuments, and the like, and shear the grass close thereto,—and this without damage to the reel of the mower and/or the cutting bar if the latter be present.

Again, the structure is such that the cutting element or mower proper may be utilized as a pivot and the power unit guided and made to travel in a circle thus enabling the operator to easily make a sharp turn at the corner of a cutting operation or to double back along the swath just cut. This arrangement, moreover, when the propelling mechanism of the power unit is disconnected, enables the operator to swing the cutting unit into narrow places and cut the grass where even a hand mower would be inoperative, it being understood that the cutting means is still being actuated by power.

A still further object of the invention is to provide a power driven lawn mower whereby no part of the combined tractor and power unit, as such, travels on uncut grass after marginal swaths have been cut, thus preventing the mashing down of the uncut grass which would prevent the clean cutting thereof.

I am aware that broadly stated it is not new to provide a cutter-bar forward of the mower proper and I am also aware that it is not new to form one end of a mower structure so that it may be run close to the edge of a wall or the like, as above mentioned. The present structure, however, presents certain advantages over those which have heretofore been suggested along this line and such advantages will appear from the following description.

With these and other objects and advantages in view, reference will be had to the annexed drawings wherein—

Fig. 3 is a vertical sectional view taken on the line III—III of Fig. 2, looking in the direction of the arrow as indicated;

Fig. 4 is a section on the line IV—IV of Fig. 2, illustrative of the guiding means employed in connection with the supporting framework of the cutting unit;

Fig. 5 is a horizontal section, on the line V—V of Fig. 4, also illustrative of said guiding means;

Fig. 6 is a diagrammatic view illustrating the power unit and cutting unit as working upon different levels;

Fig. 7 is a side elevation of such parts, looking from the right of Fig. 6, the dotted lines showing the position which the cutting unit may assume when it passes from the mound shown in Fig. 6 onto level ground;

Figs. 8, 9 and 10 are diagrammatic views showing various positions which the power unit and the cutting unit may assume under various surface conditions;

Fig. 11 is a top plan view, with parts broken away, of the tractor unit showing the clutches and the controlling means therefor; and Fig. 12 is a section on line XII—XII of Fig. 11, including the clutch operating handles.

Figure 1:
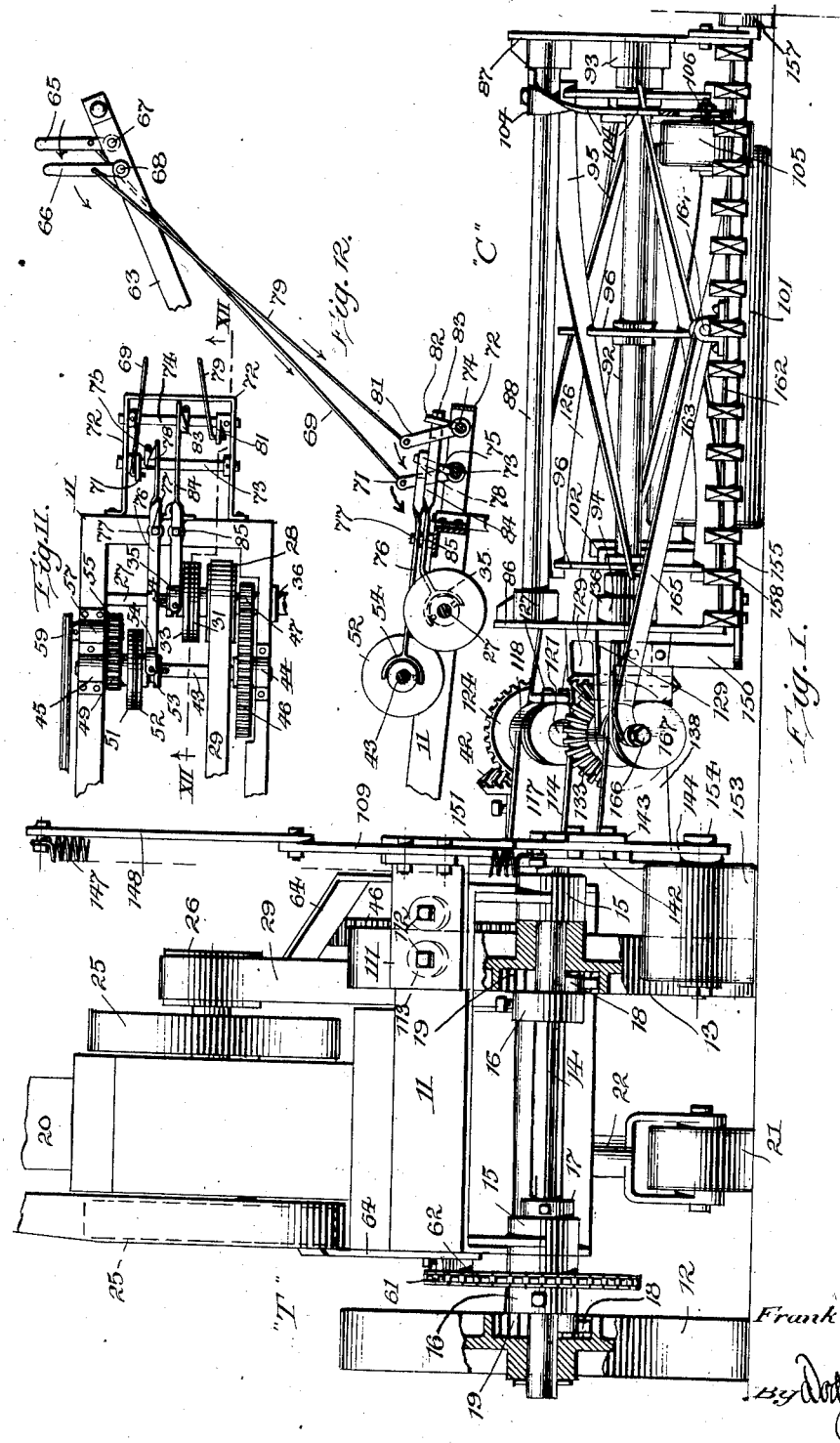
Figure 1 is a front elevation of the power unit with the cutting unit attached thereto.

At the outset, it is to be understood that the details of the power source are not disclosed in the drawings, except in so far as they are essential to the operation of the remainder of the mechanism.

The lawn mower embodying my invention comprises a tractor unit T and a cutting unit C, these characters being used to designate the two units as a whole. I will first describe the tractor unit T, pointing out in detail the various structural features thereof, and then describe the cutting unit in a similar manner.

Figure 2:
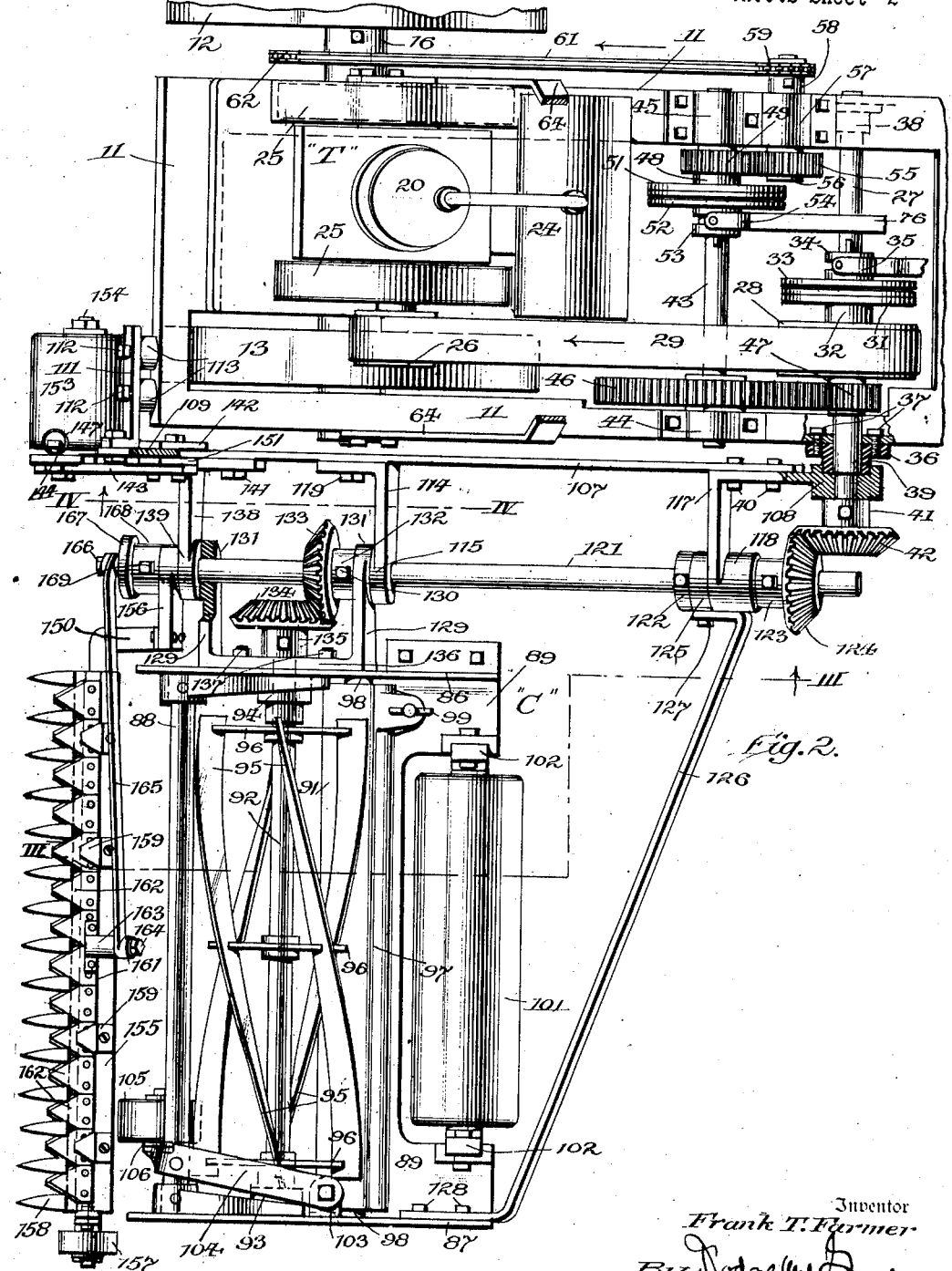
Fig. 2 is a top plan view of the combination with certain portions shown in section.

Referring first to Figs. 1 and 2, the reference character 11 designates the main frame of the tractor unit T, which frame is supported by two wheels 12 and 13, secured on an axle 14 and freely rotatable thereon. The axle 14 is supported in bearings 15 attached to the frame 11, and is prevented from lateral movement with respect to such bearings by collars 16 and 17 carried by this axle. As shown in Fig. 1, the wheels 12 and 13 contain ratchet teeth 19 which cooperate with pawls 18 carried by collars 16. These pawls are so related to the ratchet teeth 19 that the tractor unit may move in a forward direction freely on the axle 14, but will be prevented from reverse movement by the engagement of the pawls and ratchet teeth. Inasmuch as the axle 14 functions as a driving element for the wheels, rotation of this axle in the proper direction will cause pawls 18 to engage ratchet teeth 19 and thereby form a driving connection with these wheels. In addition to the wheels 12 and 13, the frame 11 is supported at the rear by a castor 21, this castor being swiveled about a mounting 22 connected to the rear end of frame 11. (See Fig. 3.)

Mounted on the frame 11 above the wheels 12 and 13 is a power source, preferably an engine of the internal combustion type, which functions both as a driving element for the tractor unit and as a source of power for the cutting unit, whereby the cutting unit is both propelled and the cutting means actuated. As here shown, this engine includes a cylinder 20, a fuel tank 24, fly wheels 25 and a driving pulley 26, the driving pulley being carried by an extension of the crank shaft on which the fly wheels are mounted. The details of the engine are not important, and are merely shown diagrammatically as it is obvious that any type of self-contained power unit may be employed.

Rotatably mounted on the frame 11 rearwardly of the engine is a drive shaft 27 carried in bearings 36 and 38, the bearing 36 being secured to the frame by bolts 37. Rotatably mounted on the shaft 27 is a sleeve 32 having secured to it a driving pulley 28 and a clutch plate 31. The pulley 28 and the engine pulley 26 are shown as connected by a belt 29, but it is obvious that the pulleys and belt may be replaced by a chain and sprocket drive.

Also mounted on the shaft 27 in engageable relation with the clutch plate 31, is a cooperating clutch plate 33 which is rigidly secured to a clutch collar 34 splined to the shaft 27 and controlled by a clutch shifting fork 35.

By movement of the fork 35, the plate 33 may be brought into contact with the plate 31, thereby connecting the shaft 27 into driving relation with the pulley 28 and the engine. Disengagement of the clutch plate will disconnect the power from the shaft 27, thus allowing sleeve 32 to rotate freely on this shaft.

The shaft 27 is carried at one end in the bearing 36, which bearing has a reduced extension 39, and the free end of the shaft carries a collar 41 having integral with it a bevel gear 42 and secured in place by a set screw. The shaft 27 likewise carries a pinion 47, rigidly secured to an extension of sleeve 32 which, in turn, carries the pulley 28 so that whenever the sleeve is rotated the gear 47 is positively driven.

The shaft 27 operates as a main driving shaft for transmitting power from the engine to the cutting unit through the bevel gear 42. For the purpose of transmitting power to the wheels 12 and 13 of the tractor, I provide a counter shaft 43 mounted in bearings 44 and 45 on frame 11 approximately midway between the shaft 27 and the engine. One end of the shaft 43 has rigidly secured to it a gear 46 which meshes with the pinion 47 on shaft 27, and is constantly connected thereto, so that whenever pinion 47 is rotating, the gear 46 and likewise the shaft 43 are driven at a reduced speed.

On the end of shaft 43 remote from the gear 46, is loosely mounted a sleeve 48 carrying a gear 49 rigidly secured to it at one end, and a clutch plate 51 at the other end. In engageable relation with the clutch plate 51 is a second clutch plate 52 secured to a clutch collar 53 splined to shaft 43 and controlled by a shifting fork 54. When the shaft 43 is rotating, the collar 53 and clutch plate 52 are positively driven. When, however, plate 52 is moved into engagement with plate 51, the sleeve 48 and gear 49 are likewise driven and transmit power to the axle of the tractor unit through a gear 55 carried on a stub shaft 56 mounted in bearing 57 on the main frame. The outer end of this stub shaft carries a collar 58 rigidly secured to it, and a sprocket 59. The sprocket 59 drives a similar sprocket 62 of enlarged diameter on the axle 14, through a sprocket chain 61.

The tractor unit as a whole may be guided by a handle 63 secured to the main frame 11 by strap elements 64. The handle 63 besides functioning as a means of guiding the tractor also serves as a support for the power controlling elements. This handle carries two power controlling levers 65 and 66 pivotally connected thereto, as at 67 and 68. The lever 65 controls the shift fork 54 for connecting and disconnecting the power source and the wheels of the tractor.

This controlling mechanism includes an actuating rod 69 pivoted to the lever 65 at one end, and to a lever 71 at the other end. Attached to the rear end of frame 11 is an auxiliary frame 72 carrying two rotatable shafts 73 and 74. The lever 71 is rigidly attached to the shaft 73, which shaft also carries a dog 75. The shifting fork 54 carries an extension 76 which is pivoted on the frame 11 at 77, and carries at its free end a cam 78 located for operative engagement with the dog 75.

As shown in Fig. 11, the clutch plates 51 and 52 are in engagement because the handle 63 occupies a position in which the dog 75 contacts with the cam 78, so as to swing the shift fork extension 76 about the pivot 77 and to bring the clutch plates into operative relation. When it is desired to disconnect these clutch plates, the lever 65 may be moved in the direction opposite to that shown by the arrow in Fig. 12, thereby rotating the lever 71; disengaging dog 75 from cam 78 and allowing clutch plate 52 to move away from clutch plate 51. If desired, the disengagement of these clutch plates may be made positive by the provision of suitable spring means which will bias the plate 52 to its disengaged position.

In a similar manner the lever 66 controls the clutch plate 33 so as to connect and disconnect the shaft 27 and the source of power. The mechanism provided in connection with this clutch is similar to that already described in connection with the clutch plates 51 and 52 and comprises a rod 79 connected to lever 66, and to a lever 81 rigidly connected to shaft 74. Shaft 74, likewise, carries a dog 82 which cooperates with a cam 83 carried by an extension 84 of shift fork 35, this fork being pivoted at 85 on the main frame 11. Consequently, when the lever 66 is moved in the direction shown by the arrow, the dog 82 engages the cam 83 to swing the extension 84 about pivot 85, and to move the clutch plate 33 into engagement with clutch plate 31, thereby connecting shaft 27 and its driving elements into positive driving relation with the pulley 28 to which power is supplied from the engine. When the lever 66 is moved in the opposite, or clockwise direction, the dog 82 is disengaged from cam 83 thereby moving clutch plate 33 away from clutch plate 31 and disengaging the power from the shaft. As before noted, it may be desirable to provide spring means for biasing the clutch plate 33 to disengaged position, relying upon the positive camming action between cam 83 and dog 82 to hold the plates in engaged relation.

It will be clear from the above that the handle 63 serves not only as a means for guiding the tractor element but it provides power controlling levers 65 and 66 in convenient position so that by a simple manipulation of one of these levers the power may be connected or disconnected from either the drive shaft 27 or the main axle of the tractor, and that either one or both of these elements may be engaged or disengaged at any time independently of the other.

As shown in the drawings, there is attached to one side of the tractor element T, laterally thereof, and in axial alignment therewith, a cutting unit C. This unit comprises a mower element made up of thin metal end plates 86 and 87, secured together at the front by a tie rod 88 and at the rear by a base plate 89. Mounted on the base plate 89 is a cutter bar support 97 pivoted at 98 and provided with the usual cutter bar adjusting means 99. Secured to the front of the cutter bar support is a cutter bar 91 having a sharpened forward face adapted to cooperate with the knives of a cutting reel. A cutting reel shaft 92 carried in bearings 93 and 94 is supported in the end plates 86 and 87. Mounted on this shaft in rigid attached relation therewith, are three spaced supporting spiders 96 carrying curved cutting knives 95 which rotate in cooperative relation with the front face of cutter bar 91.

Inasmuch as the mower unit is not provided with the usual supporting and driving wheels, the base plate 89 is cut away to form a U-shaped opening in which is mounted a longitudinal roller 101, supported on the base plate 89 in the usual adjustable bearings 102. This roller 101 constitutes the main support for the cutter element, and during the operation of the mower is constantly in engagement with the surface of the ground over which the mower is traveling. It will be observed that the end plate 87 of this cutting element is very thin, carries no projections on its outer face, and that the reel bearing and frame structure is such as to place the ends of the knives in very close relation to the inside of plate 87. The purpose of this arrangement will be set forth in detail farther on.

The inside of end plate 87 carries a lug 103 to which is bolted a pilot roller bracket 104 extending over the top of the reel, and then downwardly in front of the same to receive a pilot roller 105. This roller is rotatably mounted on a bearing 106 secured to the bracket 104 and is normally out of engagement with the surface of the ground. Its function is to prevent the knives of the mower from cutting into the earth or striking stones or other obstructions when the mower is in use. Adjustments are so made that when the mower approaches a rise in ground or an obstruction, the roller will engage it and lift the knives of the mower up to a safe position.

Having described the details of the cutting element, I will now point out the manner in which it is secured to the tractor element from which it derives its propelling force and also the power for driving the cutting reel.

Removably attached to the side of tractor element T is a bar 107 extending throughout the length of the frame 11. This bar carries at its rear end a bracket 117 having an enlarged bearing portion 108 which fits a reduced portion of bearing 36, and engages the collar 41 on bevel gear 42. Bracket 117 is secured to bar 107 by bolts 40 and has an extension including a bearing sleeve 118. The reduced portion 39 of bearing 36, therefore, forms a support for the rear end of this bar and acts as a bearing around which the bar may pivot about a horizontal axis coincident with the axis of shaft 27. The forward end of bar 107 has rigidly attached to it a pair of spaced guide plates 142 and 151. These plates have arcuate front faces which are concentric with the curved face 152 of plate 109. This plate is secured to frame 11 by an angular bracket 111 and this bracket in turn is fastened to frame 11 by bolts 112, and held in spaced relation to this frame by spacing washers 113. This arrangement assures that the plate will always be in rigid fixed relation to the tractor frame and will furnish a positive guiding means for the bar 107. Secured to the guide plate 151, as by bolts 140, is a bar 143. Bar 143 is adjustably secured to a bracket 144 containing an adjusting slot 145 in which adjusting screws 146 carried by the bar 143 are located. The lower end of bracket 144 contains a bearing 154 for a roller 153, which roller supports the front end of bar 107 together with the mechanism carried thereby. Attached to the bracket 144 is a coil spring 147 having its other end secured to a plate 148, and this plate is adjustably secured to guide plate 109 at 149. The purpose of this spring is to support the weight of the transmission mechanism so that the cutting element will be free to rise and fall, and roller 153 will not be compelled to bear the weight of the transmission mechanism which connects the tractor and cutting units.

The purpose of the bar 107 is to act as a support for the transmission means connecting the tractor and cutting units. Attached to the bar 107 at spaced points are brackets 114 and 138. Bracket 114 is secured to the bar 107 near its center at 119, and has an outer bearing portion 115. The forward end of bar 107 likewise carries a bracket 138 secured to it by bolts 141, and having a bearing portion 139.

Supported in the bearing portions 139, 115 and 118 of brackets 114, 117 and 138 is a transmission shaft 121 carrying a collar 122 which is adjustably secured thereto, and a sleeve 123 which is rigidly connected to a bevel gear 124. Bevel gear 124 meshes with gear 42 so that power can be transmitted from shaft 27 to shaft 121. Mounted between the collar 122 and the sleeve bearing 118 is another collar 125 which is freely rotatable about the shaft 121, and has secured to it, as by bolts 127, a tie rod 126. The other end of this rod is secured to mower end plate 87 by bolts 128. The tie rod 126 acts as a brace to prevent relative rotational movement about a vertical axis between the cutter unit and the tractor unit, thereby holding them in fixed longitudinal relation.

Attached to the end plate 86 of the mower is a U-shaped bracket 129 having bearing extensions 131 which surround the shaft 121, and are freely rotatable with respect thereto. The shaft 121 carries adjacent to one of the bearing extensions 131, a collar 132 and beveled gear 133 connected together, or integrally formed. By tightening a set screw 130, the sleeve and gear may be rigidly secured to shaft 121 so as to transmit power from this shaft to another bevel gear 134 which meshes therewith and is formed integrally with a sleeve 135. Sleeve 135 is fixed on the shaft 92 of the mower reel. The bracket 129 has a flattened portion 136 which fits against end plate 86 and is secured thereto, as by bolts 137.

From the foregoing, it will be clear that when shaft 27 is rotated, power will be transmitted through shaft 121 to the mower reel shaft 92 so as to drive the cutting knives of the mower. It will also be clear that the cutter unit can rotate freely about the axis of shaft 121 because of the bearings provided by collar 125 and bearing extensions 131 on bracket 129. Furthermore, the entire cutting unit can rotate about the horizontal axis of shaft 27, so that there is substantially a universal movement provided between the cutting and tractor units. While the weight of the mower itself is borne by roller 101, the roller 153 together with the supporting spring 147, carries the weight of the transmission mechanism comprising bar 107, the brackets carried by this bar and the transmission shaft 121 together with its adjuncts. Another advantage of this structure is that the cutter unit can be readily separated from the tractor unit and another cutter unit of different size, or of the same size, may be substituted. To carry out such a substitution it is merely necessary to remove the set screw in sleeve 41 so as to disconnect this sleeve from the shaft 27, and at the other end of bar 107 to remove plate 109 by loosening bolts 112. The cutter unit may be removed, leaving the transmission mechanism connected to the tractor, by withdrawing bolt 127 of brace 126, set screw in sleeve 135, and the bolts 137 in bracket 129.

The mower combination so far described is suitable for mowing lawns where it is desired to mow up close to hedges, grave-stones, and in places which are ordinarily inaccessible. By proper manipulation of the levers 65 and 66, power may be disconnected from either the tractor unit or the cutter unit so as to pivot the entire combination, and to turn it about in confined spaces. Because of the construction of end plate 87 on the mower, it is possible to mow very close to walls, flower beds, and other obstructions which are ordinarily present on lawns. Furthermore, the possibility of pivotal movement of the cutting unit about two substantially perpendicular axes enables the operator to mow the grass on lawns of uneven contour, or, on graves in cemeteries, and in practically all places where such mowers are subject to use. The cutting unit may also be readily replaced by one of different size or by one of the same size in case one unit is defective. It is also to be understood that the pivotal arrangement illustrated is capable of general application and that in practice it is not necessary that this precise disposition of the tractor and cutting units be adhered to. The essential point is that the pivotal relation of the parts be maintained to permit relative movement between the tractor and cutting units in accordance with the contour of the terrain over which the mower is passing.

Under some conditions it may be advantageous to have some means for cutting high grass and weeds which could not be cut by the mower reel. For this purpose I provide an auxiliary cutting means comprising a bar 155 having an angular extension 150 which is pivotally attached to the shaft 121 by a bracket 156. Bar 155 is supported at its outer end by a roller 157 and carries the usual guards 158. The bar 155 carries guides 159 for a cutter bar 161 to which sections 162 are attached. Substantially midway of the cutter bar is secured a bracket 163, carrying a bearing pin 164 to which is removably secured a pitman 165. The pitman 165 is secured at its end remote from bearing 164, to a wrist pin 166 on a flanged extension 167 of sleeve 168. This sleeve together with its flanged extension is secured to the end of shaft 121 by a set screw 169, and when secured in position holds the bracket 156 in properly spaced relation to the bracket 138 with which it contacts.

When power is applied to shaft 121, the wrist pin 166 will be rotated, thereby moving the pitman 165 and reciprocating the cutter bar 161 with respect to the bar 155, and mowing down weeds and tall grass in the path of the cutting element. It will be clear that this auxiliary cutting unit is supported only at two points, namely by bracket 156 about the shaft 121, and by roller 157 at the opposite end. Consequently, this unit operates independently of the main cutting unit and conforms to variations in the ground over which it passes without any interference from the main cutting unit. The cutting unit C will operate either with or without the auxiliary cutting unit, which latter unit may be removed at any time by loosening set screw 169, and without interfering with the operation of the main cutting unit.

From the above description it will be seen that the tractor unit may be utilized to simultaneously impart motion to the cutting mechanism of the mower and likewise impart tractive force to itself and the attached cutting unit. Furthermore, by proper manipulation of the clutches the tractive action may be cut off and the motor employed merely to actuate the mower mechanism or the mower mechanism may be disconnected, insofar as its actuation is concerned, and the tractor unit alone employed. Mowers of different dimensions, according to the work to be undertaken, may be readily attached to the tractor unit.

By reason of the fact that the main driving wheels of the motor element are provided with clutches, the user of the machine can make a sharp turn by merely swinging the tractor unit about one or the other of its main supporting wheels, the clutches associated with such wheels allowing such movement. In other words one of said wheels acts as a pivot about which the whole mechanism may be rotated or turned.

It will also be noted that the means of attachment of the cutting unit to the tractor unit may be said to be universal in that the frame which supports the transmission shaft 121, upon which the mower is mounted for swinging movement, swings in an upward and downward direction about the axis of shaft 27 through which power is imparted to the transmission shaft and to the cutting means. The fact that the beveled gears between the drive shaft 27 and the companion gear 124 on the transmission shaft are in alignment with the axes of said shafts, respectively, permits the tractor unit and the cutting unit to assume various positions with relation to each other, and to the contour of the ground over which the units are passing. Thus in Figures 6 to 10 I have shown various positions that the cutting unit may assume with reference to the tractor unit.

By reason of the presence of the small pilot roller 105 attached to the frame, the cutting unit will be raised and tilted in case the machine runs into any obstruction which would possibly cause damage to the mower were it not lifted to a sufficient degree.

Although I have herein shown and described only one form of lawn mower embodying my invention, it will be obvious that changes may be made in the details without departing from the spirit and scope of the invention as expressed in the claims.

What is claimed is:

1. In a lawn mower, the combination with a mobile power unit of a cutting unit including a cutting element; means for actuating said cutting element from said power unit; and a pivotal connection between the power unit and the cutting unit whereby limited relative movement between the two units about two relatively displaced angularly related axes may take place through angles up to substantially 90° in either direction from a horizontal plane without disturbing the actuating connection.

2. In a mower, the combination with a tractor unit, of a cutting unit including cutting mechanism disposed laterally of, and pivoted to said tractor unit about a plurality of axes, said axes being permanently fixed at right angles to each other, and means for actuating the cutting mechanism from the tractor unit.

3. In a lawn mower, the combination with a mobile power unit, of a cutting unit capable of swinging movement with respect to the power unit about a plurality of angularly related axes, said cutting unit being rotatable through angles up to 90° in either direction from the horizontal; and driving means for said cutting unit, said means being carried by the power unit and operative in all positions of the cutting unit.

4. The combination with a mobile power and tractor unit, of a cutting unit including cutting mechanism, mounted for pivotal movement with respect to said mobile unit about a plurality of axes maintained in fixed relation to each other and displaced by an angle of 90°; and means for actuating said cutting mechanism in all positions of said units.

5. In a lawn mower, a tractor unit including a power source; a cutting unit disposed laterally of the tractor unit and pivotally connected for limited rotational movement with respect thereto, through an angle of 90° in either direction from the horizontal; and means for driving either or both of said units from said power source in all positions of said units.

6. In a lawn mower, a tractor unit including a power source; a cutting unit disposed laterally of said tractor unit and capable of pivotal movement with respect to the tractor unit about a plurality of axes disposed at right angles to each other, one of said axes being fixed relatively to one of said units, and the other being movable about said first axis in a plane at right angles to such axis; an actuating connection between the power source and the cutting unit, said connection being operative in all positions of said units; means for operatively connecting the power source with the tractor unit; and means for controlling the actuating connection between the power source and the cutting unit independently of the connection between the power source and the tractor unit.

7. A lawn mower comprising a mobile power driven tractor unit; a mobile cutting unit pivotally connected to said tractor unit about two mutually perpendicular axes; and means mounted between said units for propelling and supplying power to the cutting unit while maintaining the two units in fixed axial alignment, said means being operative for all relative angular positions of the tractor and cutting units.

8. A lawn mower comprising a tractor unit including a source of power; a cutting unit pivoted to and disposed laterally of said tractor unit, said cutting unit including a rotary cutting element; a reciprocating cutting element disposed in front of the rotary cutting element and also pivoted to the tractor unit; and means for connecting the source of power to both of said elements, or to one of said elements and the tractor unit, or to the tractor unit alone.

9. In a lawn mower, the combination with a tractor unit including a power source, of a power transmission shaft disposed longitudinally of the tractor unit; means for connecting or disconnecting said source and said shaft; a cutting unit pivoted on said shaft; and a driving connection between the shaft and cutting unit.

10. In a lawn mower, the combination with a tractor unit including a power source, of a power transmission shaft disposed longitudinally of the tractor unit; means for connecting or disconnecting said source and said shaft; a rotary cutting unit pivoted on said shaft; a driving connection between the shaft and the rotary cutting unit; a reciprocating cutter disposed in front of the rotary cutting unit and pivoted about said shaft; and a driving connection between said shaft and said reciprocating cutter.

11. In a lawn mower, a tractor unit carrying a power source; means for placing said unit in propelling relation with said source; a cutting unit pivotally connected to said tractor unit about two mutually perpendicular axes; a single supporting roller on said cutting unit; means for driving said cutting unit from said power source; and a pilot roller carried by and in front of said cutting unit.

12. A lawn mower, a tractor unit carrying a power source; a cutting unit disposed laterally of the tractor unit, and arranged to mow a path in parallelism with the path of movement of the tractor unit; power transmission means between said units; means carried by the tractor unit for at least partially supporting the transmission means; and a pivotal connection about two relatively perpendicular axes between the two units, said connection permitting said cutting unit to swing through an angle of substantially 90° above or below the horizontal without disturbing the power transmission.

13. In a lawn mower, the combination with a tractor unit including a power source, of a power transmission shaft disposed longitudinally of the tractor unit; means for connecting or disconnecting said source and said shaft; a cutting unit disposed laterally of the tractor unit and having a projecting driving shaft; and bevel gear connections between the power source and the transmission shaft, and between the transmission shaft and the driving shaft whereby the cutting unit is actuated regardless of pivotal movement between the two units.

14. In a mower, the combination with a tractor unit, of a cutting unit including cutting mechanism disposed adjacent to said tractor unit and pivoted to it about a plurality of axes, said axes being permanently fixed at right angles to each other; and means for actuating said cutting mechanism from the tractor unit.

15. In a mower, a tractor unit having a driven shaft mounted along one side thereof and capable of pivotal movement about an axis at right angles to the shaft; and a cutting unit arranged in driven relation to the shaft and at right angles to it, said cutting and tractor units being capable of relative rotational movement without disturbing the driving connection between them.

FRANK T. FARMER.